United States Patent
Schroeder

(10) Patent No.: US 8,474,763 B2
(45) Date of Patent: Jul. 2, 2013

(54) WING ARRANGEMENT COMPRISING AN ADJUSTABLE FLAP AND FAIRING ELEMENT FOR COVERING A FLAP ADJUSTMENT MECHANISM OF A WING

(75) Inventor: Karsten Schroeder, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 31 days.

(21) Appl. No.: 13/529,855

(22) Filed: Jun. 21, 2012

(65) Prior Publication Data
US 2012/0292453 A1 Nov. 22, 2012

Related U.S. Application Data

(63) Continuation of application No. PCT/EP2010/070297, filed on Dec. 20, 2010.
(60) Provisional application No. 61/289,255, filed on Dec. 22, 2009.

(30) Foreign Application Priority Data

Dec. 22, 2009 (DE) .......................... 10 2009 060 082

(51) Int. Cl.
  *B64C 3/58* (2006.01)
(52) U.S. Cl.
  USPC ......................................... 244/213; 244/215
(58) Field of Classification Search
  USPC .......................................................... 244/213
  See application file for complete search history.

(56) References Cited

U.S. PATENT DOCUMENTS

| 4,034,939 | A | * | 7/1977 | Ridley et al. ..................... 244/87 |
| 4,796,840 | A | * | 1/1989 | Heynatz ......................... 244/215 |
| 4,854,528 | A | * | 8/1989 | Hofrichter .................... 244/215 |
| 5,096,142 | A | * | 3/1992 | Rodriguez ...................... 244/87 |
| 6,565,045 | B1 | * | 5/2003 | Correge et al. ............... 244/215 |
| 6,641,089 | B2 | * | 11/2003 | Schwetzler et al. .......... 244/198 |
| 7,410,133 | B2 | * | 8/2008 | Lee et al. ...................... 244/215 |
| 7,740,206 | B2 | * | 6/2010 | Eaton et al. ................... 244/201 |

(Continued)

FOREIGN PATENT DOCUMENTS

DE 9311209 U1 11/1993

OTHER PUBLICATIONS

International Searching Authority, International Search Report dated Apr. 12, 2011 for International Application No. PCT/EP2010/070297.
German Patent Office, German Office Action dated Oct. 19, 2011 for German Patent Application No. 10 2009 060 082.5.

*Primary Examiner* — Christopher P Ellis
*Assistant Examiner* — Medhat Badawi
(74) *Attorney, Agent, or Firm* — Ingrassia Fisher & Lorenz P.C.

(57) ABSTRACT

A wing arrangement includes, but is not limited to an adjustable flap, which is adjustable between a retracted position and at least one extended position, has at least one fairing element for covering a flap adjustment mechanism and at least one cover element. The fairing element extends downstream at least as far as the flap and has, in a surface facing the flap, a cutout which correlates with an intended adjustment movement of the flap. The cover element is movably arranged with respect to the fairing element and adapted such to cover the cutout in the fairing element in the retracted position of the flap and expose at least part of said cutout in an extended position.

15 Claims, 4 Drawing Sheets

U.S. PATENT DOCUMENTS

| | | | |
|---|---|---|---|
| 7,798,450 B2* | 9/2010 | Patzelt et al. | 244/211 |
| 2003/0102410 A1* | 6/2003 | Gessler et al. | 244/215 |
| 2007/0221789 A1* | 9/2007 | Lee et al. | 244/211 |
| 2008/0116717 A1* | 5/2008 | Honeycutt | 296/180.5 |
| 2009/0028705 A1* | 1/2009 | Meldgaard et al. | 416/23 |
| 2012/0195764 A1* | 8/2012 | Fuglsang et al. | 416/223 R |

* cited by examiner

WING ARRANGEMENT COMPRISING AN ADJUSTABLE FLAP AND FAIRING ELEMENT FOR COVERING A FLAP ADJUSTMENT MECHANISM OF A WING

CROSS-REFERENCE TO RELATED APPLICATIONS

This is a continuation of International Application No. PCT/EP2010/070297, filed Dec. 20, 2010, which application claims priority to U.S. Provisional Patent Application No. 61/289,255, filed Dec. 22, 2009, and to German Patent Application No. 10 2009 060 082.5, filed Dec. 22, 2009, which are hereby incorporated by reference in their entirety.

TECHNICAL FIELD

The technical field relates to a wing arrangement comprising an adjustable flap and to a fairing element for covering a flap adjustment mechanism of a wing.

BACKGROUND

To enhance lift or increase resistance, use is often made in aircraft of adjustable flaps which may be located in front of, on top of, behind or below a wing profile. Aside from known slats and slotted flaps or spoilers, in particular in sports-style motor vehicle construction but also occasionally in aircraft construction, relatively narrow, elongate trailing edge flaps exist, which are also known as "Gurney flaps" or "Mini Trailing Edge Devices" (Mini TEDs). For simplicity, devices of this type are referred to as "flaps" hereinafter, since the invention described below relates solely to flaps of this type.

In aircraft construction, these flaps are preferably arranged on the lower side of wings, in the region of the wing trailing edge, and are adapted to be pivoted between a horizontal position (parallel to the direction of flow) and a substantially perpendicular position. In the perpendicular position, the flaps extend in a perpendicular manner from the lower side of the wing into the flow surrounding the aircraft.

Flaps of this type are relatively small; for example, the depth of a flap might only equate to approximately 1%-2% of the wing depth. Nevertheless, a clearly noticeable lift-enhancing effect can thereby be achieved. The flaps alter the flow-off condition at the trailing edge of the wing, thereby improving pressure distribution. In addition, owing to the rapid movability thereof, these flaps should also be able to actively compensate for gusts.

Actuators are needed to move the flaps and have to be covered with fairing elements from the point at which they extend beyond the wing profile, since without fairing they would project into the flow around the wing and increase the resistance of the aircraft. The problem in this case is that fairing elements of this type must be fixed to the lower side of the wing, on account of the flap adjustment mechanism extending there, and consequently obstructs the flaps themselves.

In an aerodynamically advantageous configuration thereof, the fairing elements would project downstream relatively far beyond the flaps, and a corresponding cutout would therefore be necessary on the upper side of the fairing elements to make possible a dipping movement of the flaps. Yet while said cutout may indeed remedy the kinematic problem, it may also result in a noise such as that from an organ pipe, meaning that a solution of this type would not necessarily be preferable. Transverse flow through the fairing element, which flow may also lead to aerodynamic resistance, is also prevented.

Alternatively, a fairing element may be formed sub-optimally from an aerodynamic perspective in such a way that it ends in a region in front of the intended perpendicular end position of the flaps, for example in front of a hinge line. This, however, would engender abrupt transitions between the fairing elements and the surroundings, thereby resulting in the formation of vortices, which heighten the resistance of the aircraft.

DE 101 56 733 B4 and US 2003/0102410 A1 show an aerodynamic profile comprising an adjustable flap, wherein the flap can be adjusted by an adjusting lever which is located below the profile and is exposed, not being covered by a fairing element.

A wing arrangement comprising adjustable flaps in the trailing edge region of the wing has not yet been optimally achieved aerodynamically. Therefore, it is at least one object to object to provide a wing arrangement, comprising an adjustable flap, in which mechanically simple adjustment of the flap can be achieved, with, at the same time, high aerodynamic performance of a wing arrangement and reducing little noise generation therein. In addition, other objects, desirable features and characteristics will become apparent from the subsequent summary and detailed description, and the appended claims, taken in conjunction with the accompanying drawings and this background.

SUMMARY

A wing arrangement has at least one adjustable flap, which can be adjusted between a retracted position and at least one extended position. At least one fairing element for covering an adjustment mechanism of the flap and at least one cover element are positioned on the wing arrangement. The fairing element extends downstream at least as far as the flap and, in a surface facing the flap, has a cutout which correlates with an intended adjustment movement of the flap. The cover element is movably arranged with respect to the fairing element and is furthermore adapted to cover the cutout in the fairing element in the retracted position of the flap and expose at least part of said cutout in an extended position.

As a result, a fairing element of this type can have an aerodynamically advantageous shape and can, for example, extend downstream, beneath a wing, beyond the wing trailing edge. The generation of resistance-increasing vortices on account of the flap adjustment mechanism can thus be eliminated for the wing arrangement in cruise flight. At the same time, the adjustable flap is able to move without obstruction into an extended position, since the cover element is adapted to it only seal off the cutout in the fairing element completely once the flap is in the retracted position. Accordingly, the aerodynamic performance of the fairing element is not impaired in cruise flight, when the flap is retracted, by a constantly exposed cutout or a sharp cross-sectional transition. The configuration of the wing arrangement according to the invention thus contributes neither to an additional increase in the overall resistance of the aircraft nor, therefore, to an increase in the fuel requirement.

According to an embodiment, the fairing element has at least one wall which is arranged at an angle to the lower side of the wing, the cover element having a correspondingly formed cover wall which rests flush against the wall of the fairing element. The cutout is formed in the at least one wall. Regardless of whether the cover element is located on the inner side of the wall of the fairing element or on the outer side, the cutout region of the fairing element is supplemented in an aerodynamically advantageous manner by the cover element and is fully closed when the flap is retracted.

Generally speaking, the simplest form of the fairing element may resemble that of a flap track fairing of a high lift system and be defined laterally by two walls which are supplemented by a base element to form a trough-like housing. The base element is located on a side of the fairing element which points away from the wing.

According to an embodiment, the flap is pivotally mounted on a hinge and, when adjusted, effects a pivoting movement which reproduces the shape of a circle segment in a plane which is oriented perpendicular to the hinge pin. As a result, the cutout in the fairing element is of a corresponding shape when viewed in a plane perpendicular to the hinge pin; that is to say, the cutout is in the shape of a circle segment. In the case of a flap which moves through 90° from an approximately horizontal position into a position which is approximately perpendicular to the longitudinal axis of the wing arrangement, a quadrant-shaped cutout is thus necessary in the fairing element.

According to an embodiment, the cover element is configured in the shape of two cover walls which are guided with respect to two corresponding walls of the fairing element in the region of the cutout in the fairing element. This is a mechanically very simple yet robust solution, which does not require a large number of parts and is lightweight.

According to an embodiment, the cover element is spring-mounted about a hinge pin on the fairing element. The hinge pin may be arranged upstream from a hinge pin of the flap or coincide therewith. The idle position of the cover element thus corresponds to a retracted flap, and the cover element therefore minimizes the cutout in the fairing element when the flap is retracted. This also means that, in the event of an extending movement thereof, the flap is able to push the cover element in against a spring force, and the cutout in the fairing element is therefore exposed owing to the cover element moving away. When the flap pivots back, the cover element preferably pivots back again in a spring-assisted manner, thereby automatically sealing off the cutout.

According to a further embodiment, the cover element is arranged on the side of the flap which projects towards the fairing element, in such a way that, when the flap moves, the cover element is guided automatically with respect to the cutout in the fairing element.

In an embodiment, the fairing element is a lightweight component which, for example, consists of a sandwich material or the like. Likewise, it may be advantageous for the cover element to also have of a material which is as light as possible yet still sufficiently rigid, and, for example, to be formed as a lightweight component with a sandwich construction.

A fairing element and by a cover element that are adapted to cover a flap adjustment mechanism and to be used in a wing arrangement are also provided in accordance with an embodiment.

At least some of the advantages of the wing arrangement are that the fairing element can be formed rigidly, thereby rendering moving parts unnecessary and meaning that a relatively high degree of rigidity of the fairing element is simultaneously achieved. Particularly when applying the cover element to the flap, no additional moving parts are needed in order to activate or deactivate the covering. The optimum aerodynamic shape of the fairing element can also be achieved in such a way that no aerodynamic compromises have to be made. In addition, the wing arrangement is economical.

BRIEF DESCRIPTION OF THE DRAWINGS

Further features, advantages and possible uses are provided in the following description of the embodiments and the figures. In this respect, all of the features which are described and/or graphically illustrated form, per se and in any combination, the embodiments, irrespective of the configuration in the individual claims or the back references thereof.

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
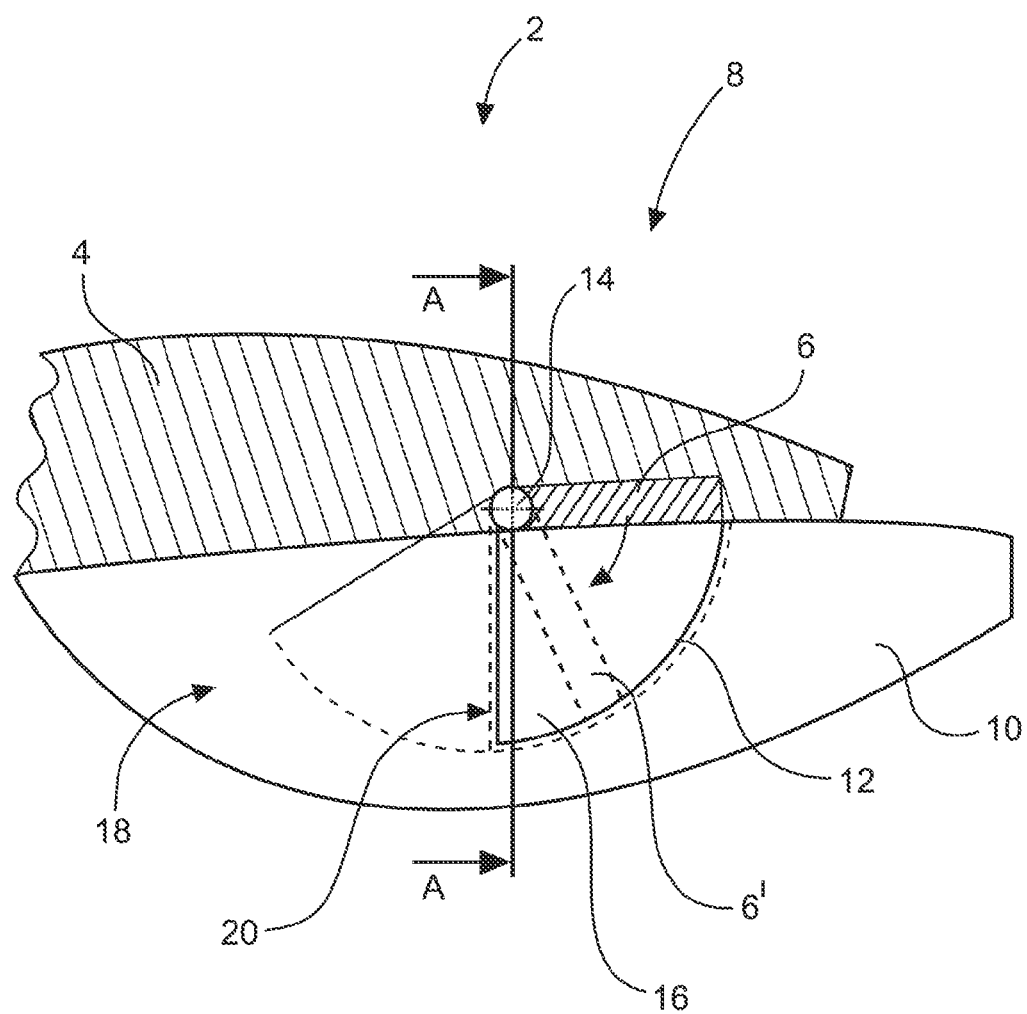
FIGS. 1a, 1b, 1c, 1d and 1e show three embodiments of the wing arrangement according with two side views, two sectional plan views, and an isometric view.

FIG. 1a shows a first embodiment of a wing arrangement 2, comprising a wing 4 and an adjustable flap 6, which is shown by way of example in a first position and in a second position 6'. A fairing element 10 is also arranged below a trailing edge region 8 of the wing 4 and extends downwards in the plane of the drawings from the wing 4, from the lower side of the wing 4.

The fairing element 10 has a quadrant-shaped cutout 12 which allows the flap 6 to pivot about a hinge pin 14 from a horizontal, extended position into one or more retracted positions 6' which would encroach into the fairing element 10. For simplicity, no adjustment mechanism is shown in FIG. 1a, since any desired types of adjustment mechanism are used to produce an adjustment movement of the flap 6. The fairing element 10 serves to encase this adjustment mechanism in an aerodynamically advantageous manner.

If the cutout 12 were exposed at all times, air streams would generate a noise around the cutout, which is not desired, in particular during take-off and landing, owing to possible noise disturbance to people who are on the ground during take-off and landing and those in the aircraft in normal flight. For this reason, the wing arrangement 2 according to the invention is adapted to allow the flap 6 to move into the flow below the wing 4, while simultaneously completely sealing off the cutout 12 when the flap 6 retracts. This is achieved in the embodiment shown here in that a cover element 16 is arranged on a side of the flap 6 pointing away from the wing 4 and is formed in accordance with the cutout 12. A quadrant shape thus lends itself to the present case, which quadrant shape may be pivoted about the hinge pin 14 together with the flap 6. Owing to flush guidance at at least one wall 18 of the fairing element 10, the cutout 12 is closed off between the side of the flap 6 pointing away from the wing 4 and an outer defining edge 20.

The cover element 16 may be fixed to the side of the flap 6 pointing away from the wing 4 using positive, non-positive or cohesive fixing methods. Welding or riveting may therefore be suitable, as may adhesion. To achieve sufficient resilience with a view to wing movements, thermal expansion and the like, a resilient intermediate layer (not shown) may be arranged between the cover element 16 and the flap 6, and may for example be adapted in such a way that the cover element walls push towards the walls of the fairing element. This may be achieved with a slightly wedge-like shape. To achieve a given residual resilience even when temperatures are low on account of the large differences in temperature between periods on the ground and in cruise flight, a silicon rubber, polyurethane or tetrafluoroethylene may be used for example, this list not being exhaustive. Moreover, these materials are advantageous in that they are relatively heat resistant and, even on hot days, should not sustain damage when the aircraft is grounded.

When the flap 6 is pivoted back into a retracted position, in which the side of the flap 6 pointing away from the wing 4 forms a planar surface with the lower side of the wing 4, the cover element 16 is arranged completely over the cutout 12, which is thereby completely sealed off This means that the fairing element 10 always has a surface which is completely closed off from the outside and the aerodynamic performance corresponds substantially to that of a fairing element 10 which has no cutout.

Figure 1B:
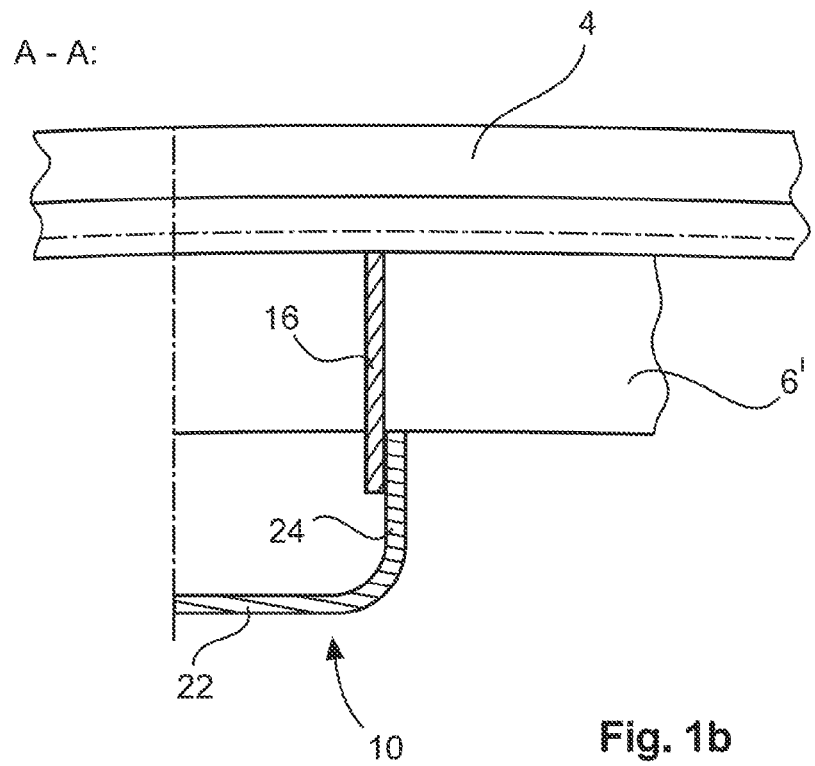

FIG. 1b shows a plan view of a section along the trailing edge of the wing 4, looking towards the pivoted flap 6'. The fairing element 10 can be seen, which, for example, may have a trough-like configuration, a corresponding base surface 22 and at least one wall 24. The cutout 12 is arranged in the wall 24 and is used in order to be able to deflect the flap 6' downwards in the plane of the drawings. The cover element 16 is located on the inner side of the fairing element 10 and rubs or slides along on the inner side of the wall 24 in a flush manner. The cover element 16 and the wall 24 overlap in a small region, thereby sealing off the cutout 12.

The fairing element 10 and the cover element 16 can be produced as lightweight components, for example by means of a sandwich construction comprising a honeycomb core and at least two external facings which limit the core layer. As a result, these relatively lightly loaded components are of a low weight, yet have sufficient rigidity to maintain their predetermined shape even under aerodynamic flow in cruise flight.

Figure 1C:
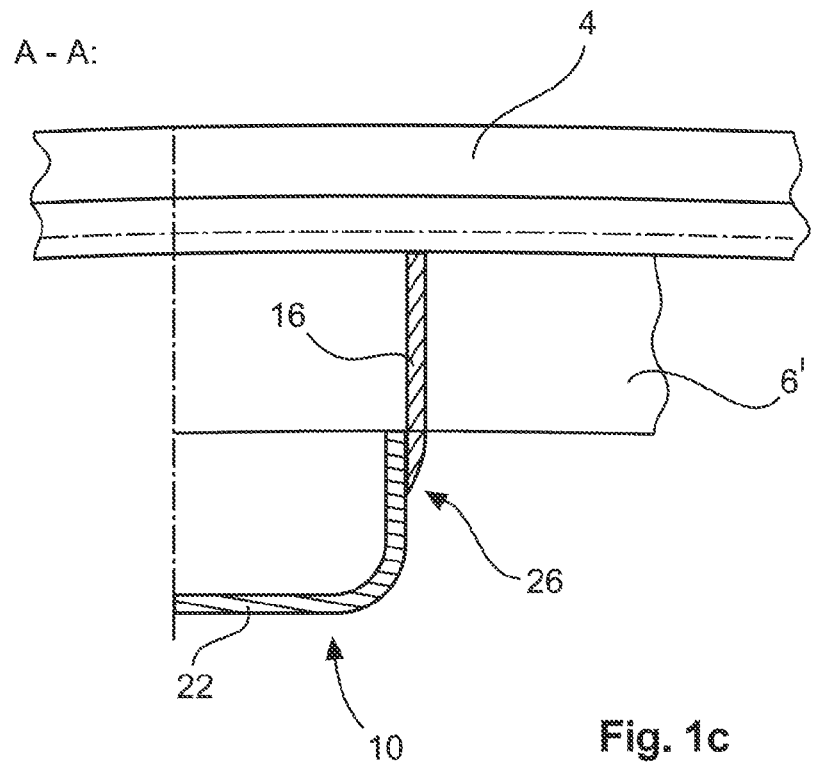

The variant in FIG. 1c shows a cover element 16 which is very similar but which is guided along the outside of the wall 24. This cover element 16 may have edges 26 which are directed towards the walls 24 and which are rounded to smooth out the outer surface made up of the fairing element and the cover element, which may optionally be slightly biased.

Figure 1D:
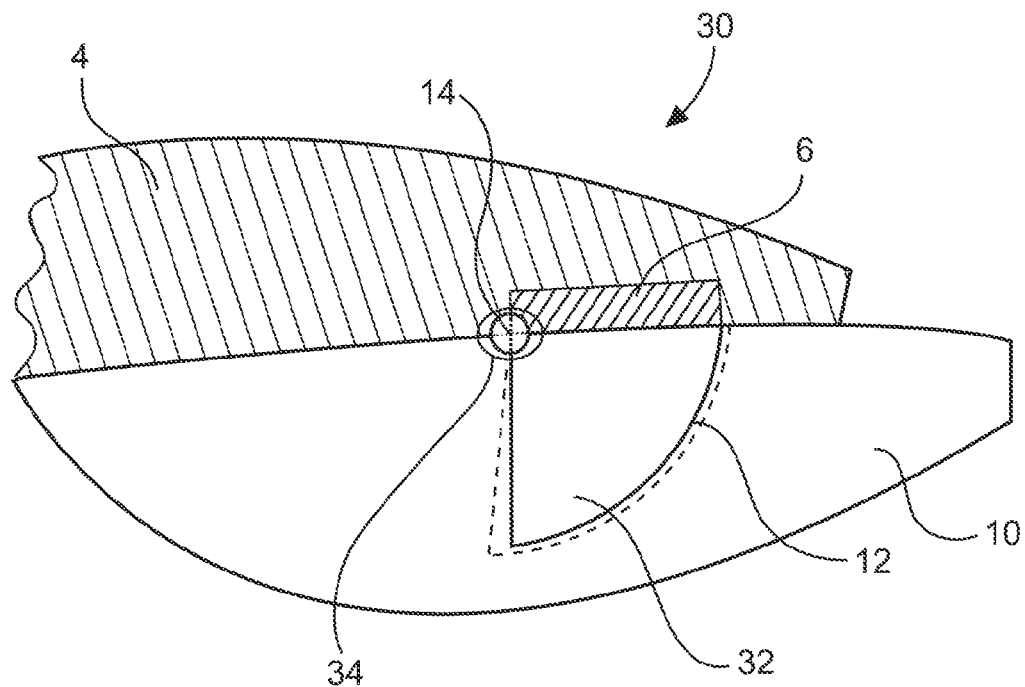

FIG. 1d shows a further embodiment in the form of a wing arrangement 30 in which a cover element 32 is provided which is pivotally mounted on the fairing element 10 about a hinge pin 14 and which is pushed via a torsion spring 34, shown by way of example, into a cover position in which the cutout 12 in the fairing element 10 is closed off. The shape of the cover element 32 corresponds to the shape of the cutout 12. Preferably, an overlap is produced between the cover element 32 and the cutout 12. In this embodiment too, the cover element 32 and the cutout are substantially quadrant-shaped, in such a way that the flap 6 is able to move through approximately 90° from a horizontal position into a perpendicular position which projects under the wing 4. The flap 6 and the cover element 32 are not mechanically interconnected; rather the cover element 32 is adapted to be pressed by the flap 6 into the fairing element 10 and to seal off the cutout 12 again when the flap 6 is pivoted back.

Figure 1E:
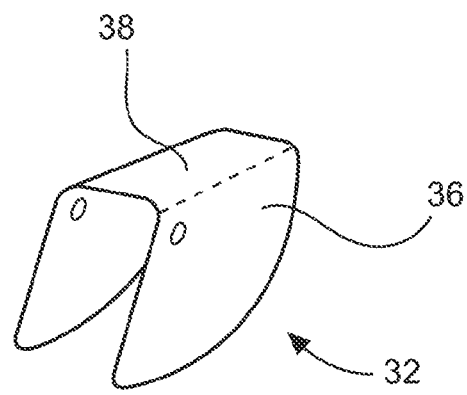

As is shown schematically in an isometric view in FIG. 1e, in addition to two walls 36 the cover element 32 also has a top element 38 which connects the two walls 36 to each other. When the flap 6 is retracted, the top element 38 is aligned flush with the side of the fairing element 10 which projects towards the wing 4.

Figure 2:
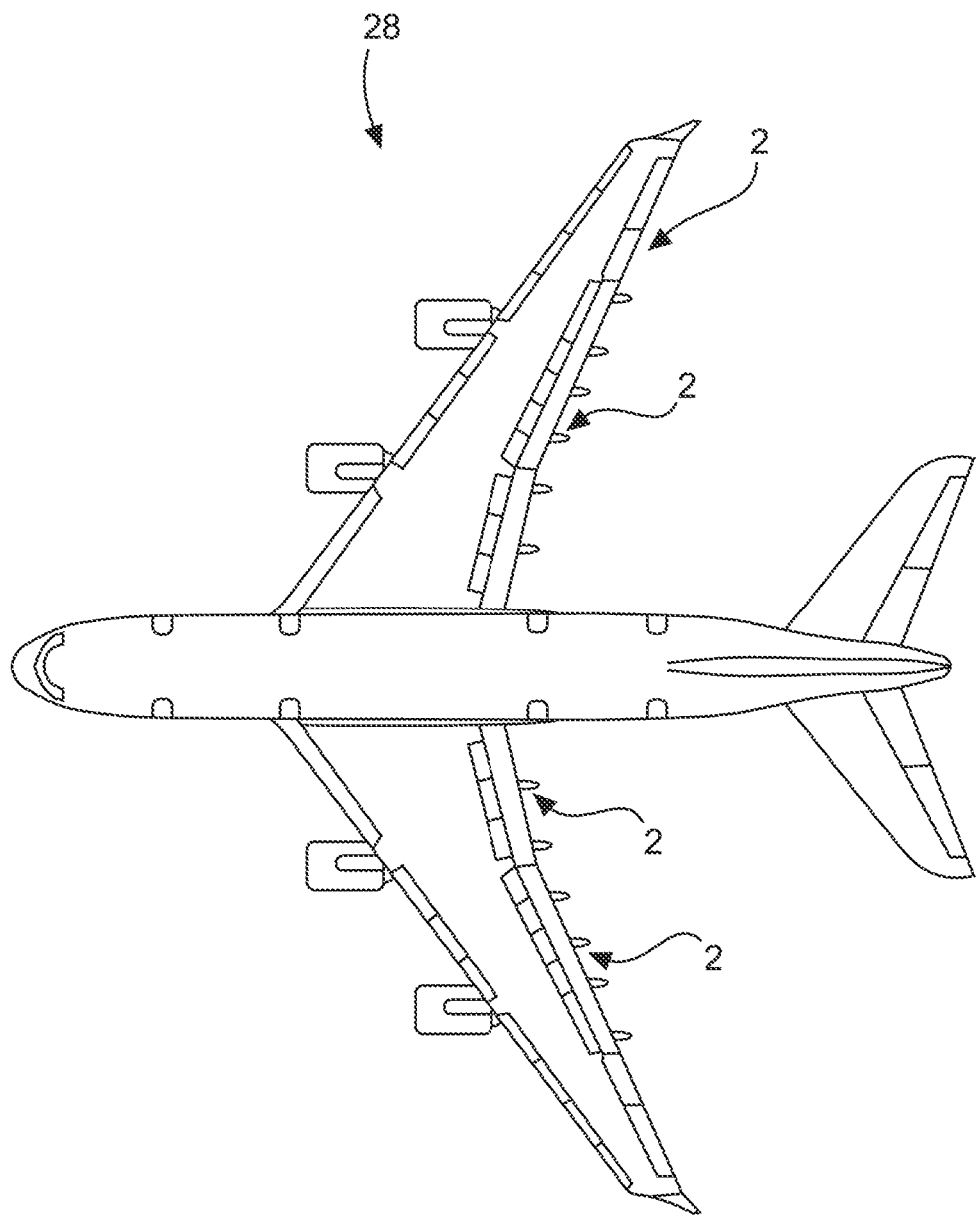
FIG. 2 shows an aircraft equipped with a wing arrangement.

Finally, FIG. 2 shows an aircraft 28 which comprises at least one wing arrangement 2. This illustration is intended to be understood solely as an example, and the type and arrangement of flaps of this type should not be interpreted as binding.

In addition, it should be noted that "have/has" or "comprise/comprises" does not exclude any other elements or steps and "a" or "an" does not exclude a plurality. It should further be noted that features which have been described in reference to one of the above embodiments may also be used in combination with other features of other embodiments or developments described above. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A wing arrangement, comprising:
   an adjustable flap that is adjustable between a retracted position and at least one extended position, the adjustable flap comprising:
      at least one fairing element that is configured to cover a flap adjustment mechanism, the at least one fairing element extending downstream at least as far as the adjustable flap and comprises, in a surface facing the adjustable flap, a cutout that correlates with an intended adjustment movement of the adjustable flap; and
      at least one cover element that is movably arrangeable with respect to the at least one fairing element and configured to cover the cutout in the at least one fairing element in the retracted position of the adjustable flap and expose at least part of said cutout in an extended position.

2. The wing arrangement according to claim 1, wherein the at least one fairing element includes at least one wall that is arranged at an angle to a lower side of a wing, and
   wherein the at least one cover element includes at least one correspondingly formed cover wall which rests flush against the wall of the at least one fairing element.

3. The wing arrangement according to claim 1, wherein the adjustable flap is pivotally mounted about a hinge pin and configured to effect a partial circular movement about the hinge pin.

4. The wing arrangement according to claim 1, wherein the at least one cover element is spring-mounted about a hinge pin on the at least one fairing element.

5. The wing arrangement according to claim 1, wherein the at least one cover element is arranged at an inner side of the at least one fairing element.

6. The wing arrangement according to claim 1, wherein the at least one cover element is arranged on the side of the adjustable flap that projects towards the at least one fairing element.

7. The wing arrangement according to claim 6, wherein the at least one cover element is fixed to the adjustable flap with a fixing method.

8. The wing arrangement according to claim 7, wherein the fixing method is a positive connection method.

9. The wing arrangement according to claim 7, wherein the fixing method is a non-positive connection method.

10. The wing arrangement according to claim 7, wherein the fixing method is a cohesive connection method.

11. The Wing arrangement according to claim 6, wherein a resilient intermediate layer is arranged between the adjustable flap and the at least one cover element.

12. A fairing element for covering a flap adjustment mechanism on a wing, comprising:
   two walls for fixing to the wing and a base element;
   a circular-segment-shaped cutout within the two walls on a side opposite the base element, the circular-segment-shaped cutout is configured to receive a flap that is pivotally arranged on the wing.

13. A cover element, comprising:
   a first circle-segment-shaped wall;
   a second circle-segment-shaped wall that is configured with the first circle-segment-shaped wall to pivot with respect to a fairing element that is fixed to a wing of an aircraft, wherein the first circle-segment-shaped wall and the second circle-segment-shaped wall are further configured to cover a circle-segment-shaped cutout in at least one fairing element when there is movement of a flap pivotally arranged on the wing.

14. The at least one cover element according to claim 10, wherein the at least one cover element is configured to be pivotally arranged on the at least one fairing element.

15. The at least one cover element according to claim 10, which is arranged on the adjustable flap.

* * * * *